United States Patent
Khan

(10) Patent No.: US 6,280,178 B1
(45) Date of Patent: Aug. 28, 2001

(54) MOLDING APPARATUS HAVING UPPER AND LOWER COMPOSITE MOLD/PRESS UNITS WITH REPLACEABLE MOLD CAVITY FORMING COMPONENTS

(75) Inventor: Mohammed Peer Khan, Pittsburgh, PA (US)

(73) Assignee: SAR Development, LP, Pittsburgh, PA (US)

( * ) Notice: Subject to any disclaimer, the term of this patent is extended or adjusted under 35 U.S.C. 154(b) by 0 days.

(21) Appl. No.: 09/419,560

(22) Filed: Oct. 18, 1999

(51) Int. Cl.⁷ .................................................. B29C 45/28
(52) U.S. Cl. ...................... 425/573; 425/409; 425/450.1; 425/451.9; 425/589; 425/595
(58) Field of Search ................................. 425/450.1, 589, 425/451.9, 595, 573, 409, 543, 4 R; 264/328.7; 249/158, 170, 102

(56) References Cited

U.S. PATENT DOCUMENTS

| | | | |
|---|---|---|---|
| 3,421,184 | * 1/1969 | Ford et al. | 425/408 |
| 3,528,134 | 9/1970 | Fischbach | 18/30 |
| 4,162,138 | * 7/1979 | Byrne | 425/125 |
| 4,383,816 | 5/1983 | Kumazaki | 425/451.9 |
| 4,592,716 | * 6/1986 | Jackson et al. | 425/330 |
| 5,096,404 | 3/1992 | Janos et al. | 425/190 |
| 5,456,588 | 10/1995 | Yonekubo et al. | 425/183 |
| 5,462,421 | * 10/1995 | Stein et al. | 425/4 R |
| 5,658,522 | * 8/1997 | Fischer | 264/328.7 |
| 5,695,790 | 12/1997 | Lin | 425/190 |
| 5,762,984 | 6/1998 | Winbauer | 425/589 |
| 5,824,249 | 10/1998 | Leitch et al. | 264/219 |
| 5,846,574 | 12/1998 | Wohlrab | 425/149 |
| 5,858,421 | 1/1999 | Wohlrab | 425/589 |

* cited by examiner

Primary Examiner—Nam Nguyen
Assistant Examiner—Joseph S. Del Sole
(74) Attorney, Agent, or Firm—Michael R. Swartz; John R. Flaunagan

(57) ABSTRACT

An injection molding apparatus for producing formed or molded millwork products includes a workstation supported on a support surface, a lower composite mold/press unit mounted upon the workstation and defining a lower portion of a mold cavity, and upper composite mold/press unit defining an upper portion of the mold cavity, and support members spaced apart from one another along the lower composite unit, movably mounted to the workstation, and extending above the lower composite unit where the support members mount the upper composite unit generally above and for movement toward and away from the lower composite unit. Either of the lower and upper mold/press units can have replaceable plates for different shaped products. The apparatus also includes actuators for the support members and releasable locking mechanisms for the upper composite unit.

25 Claims, 10 Drawing Sheets

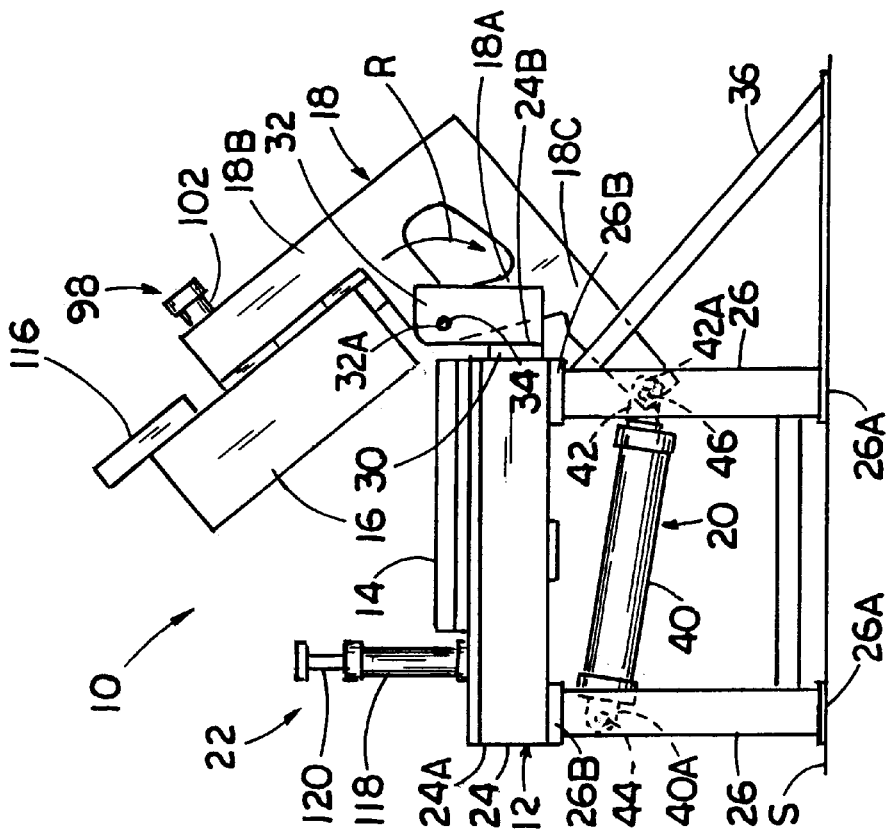
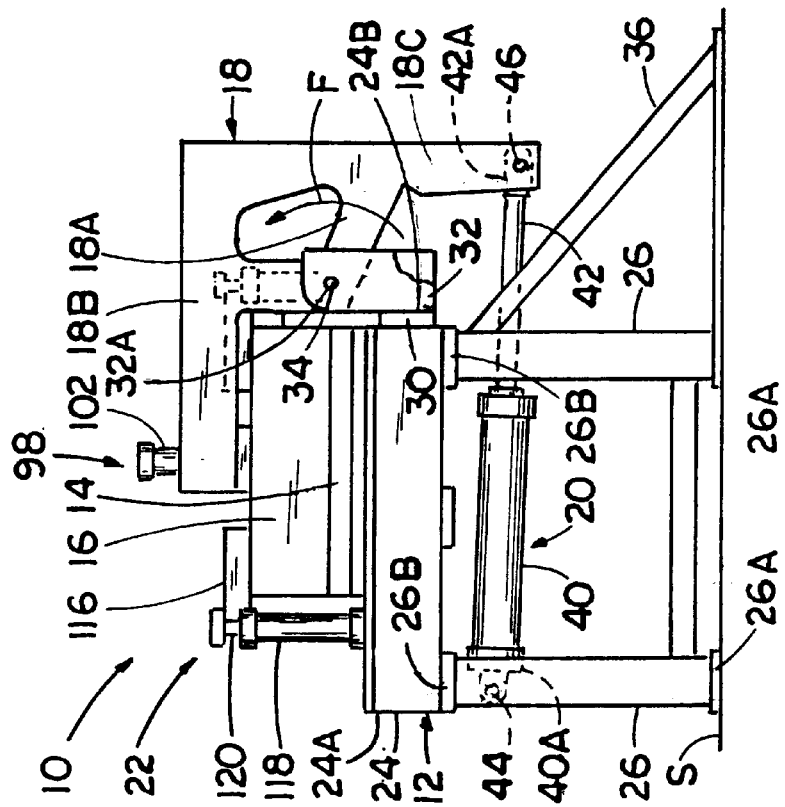
FIG. 4
FIG. 3

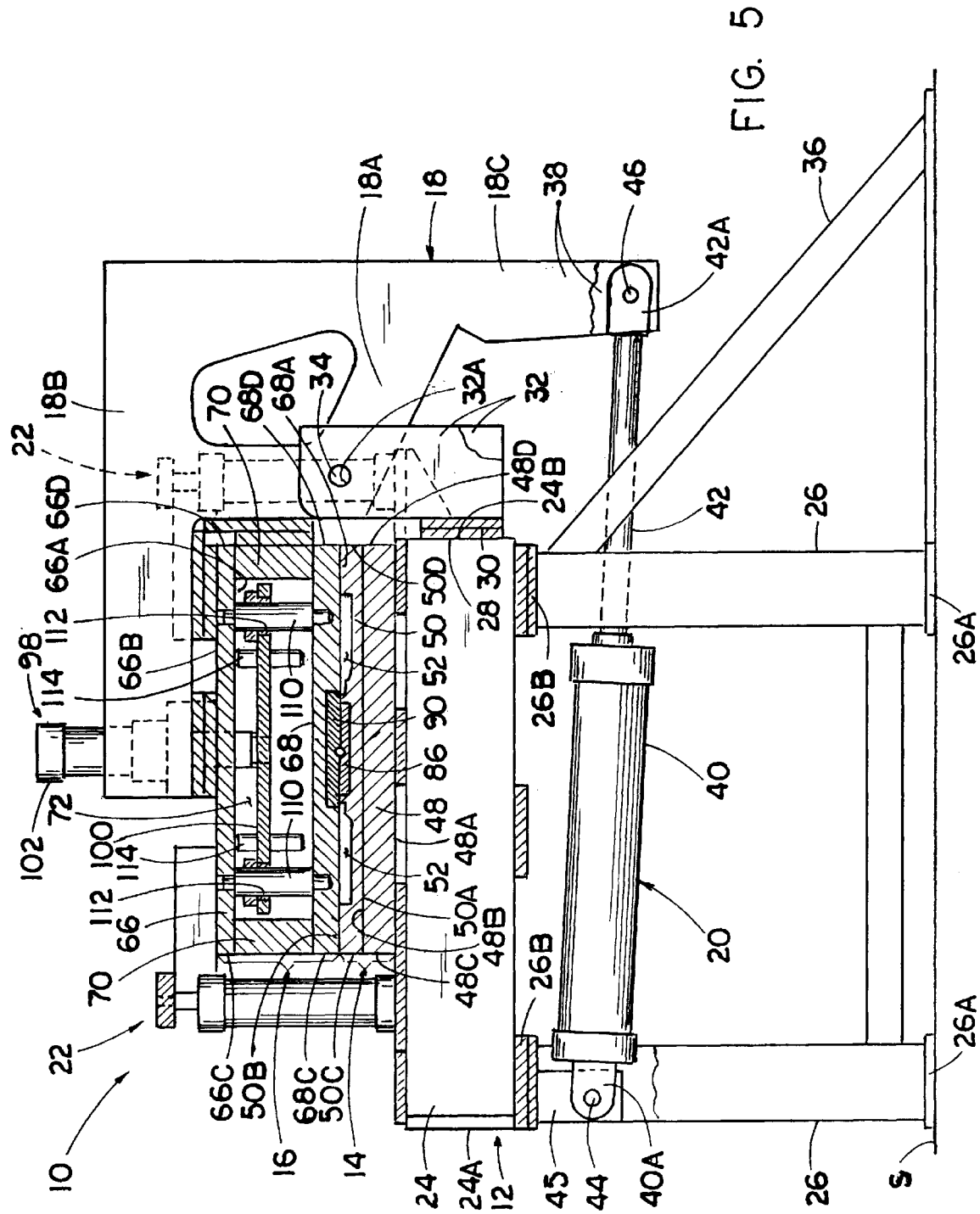

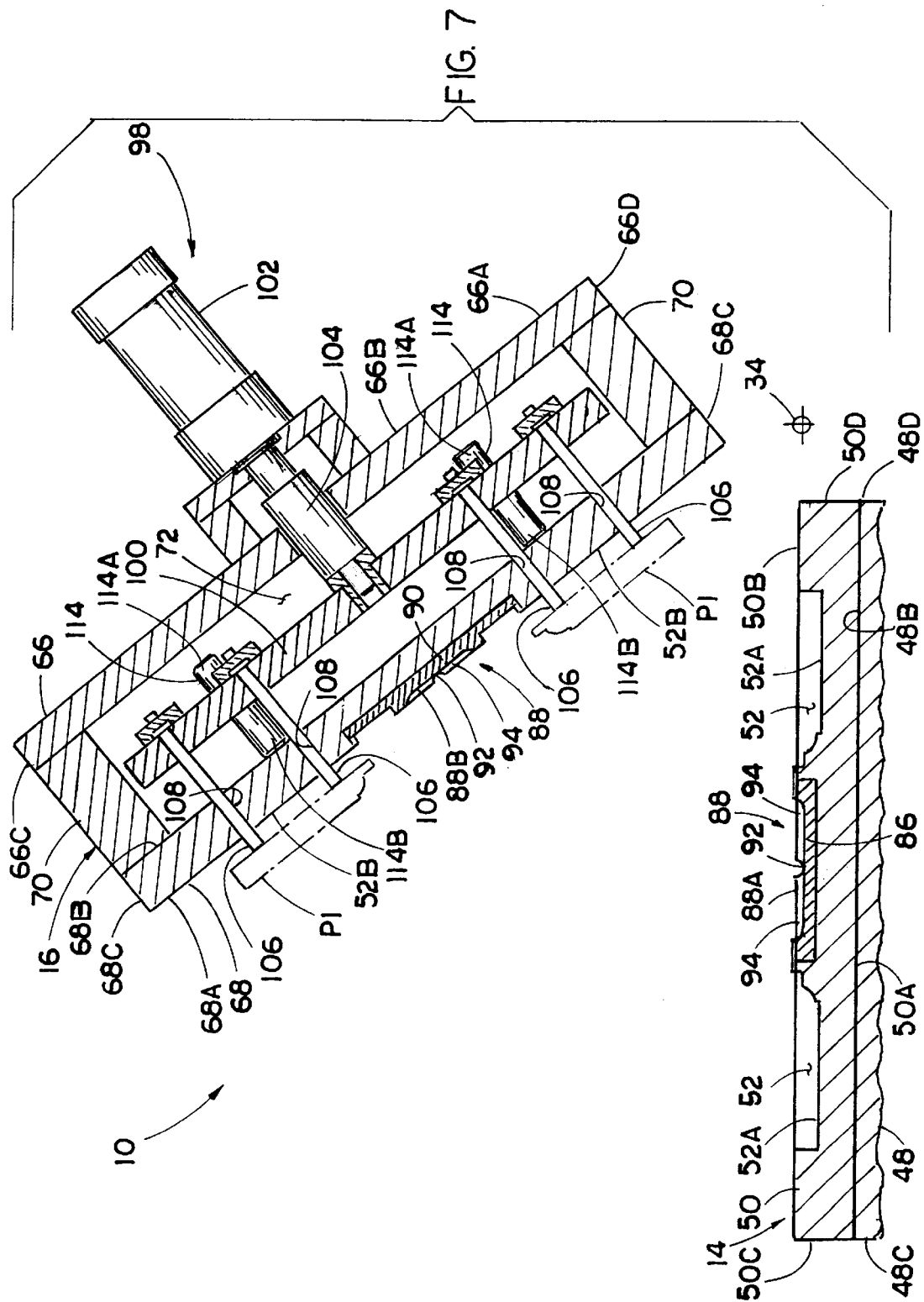

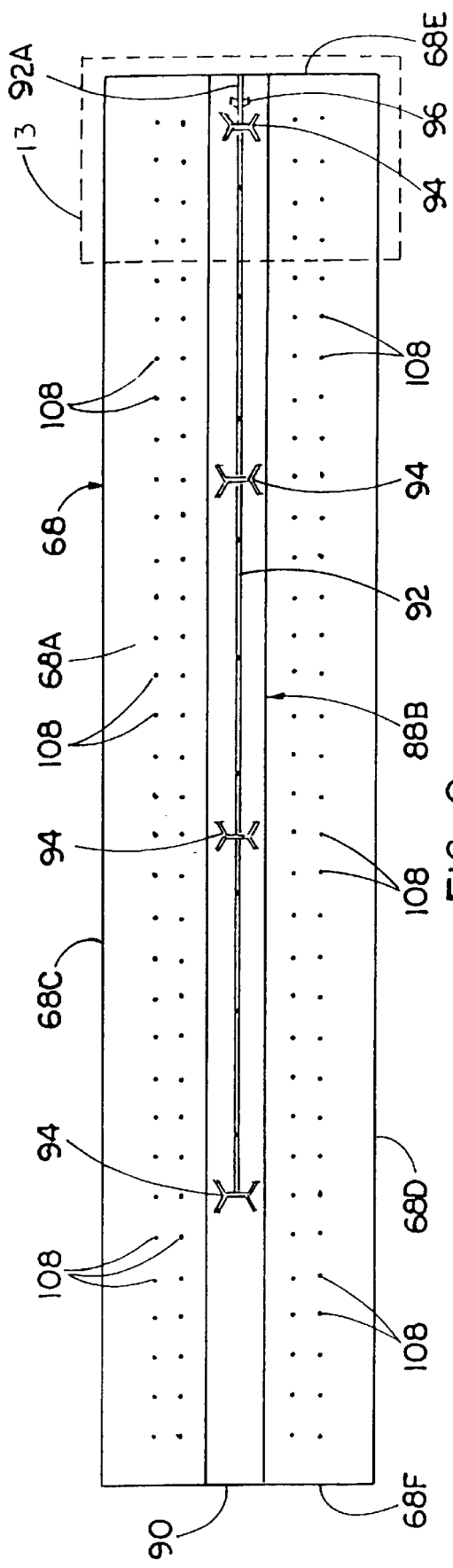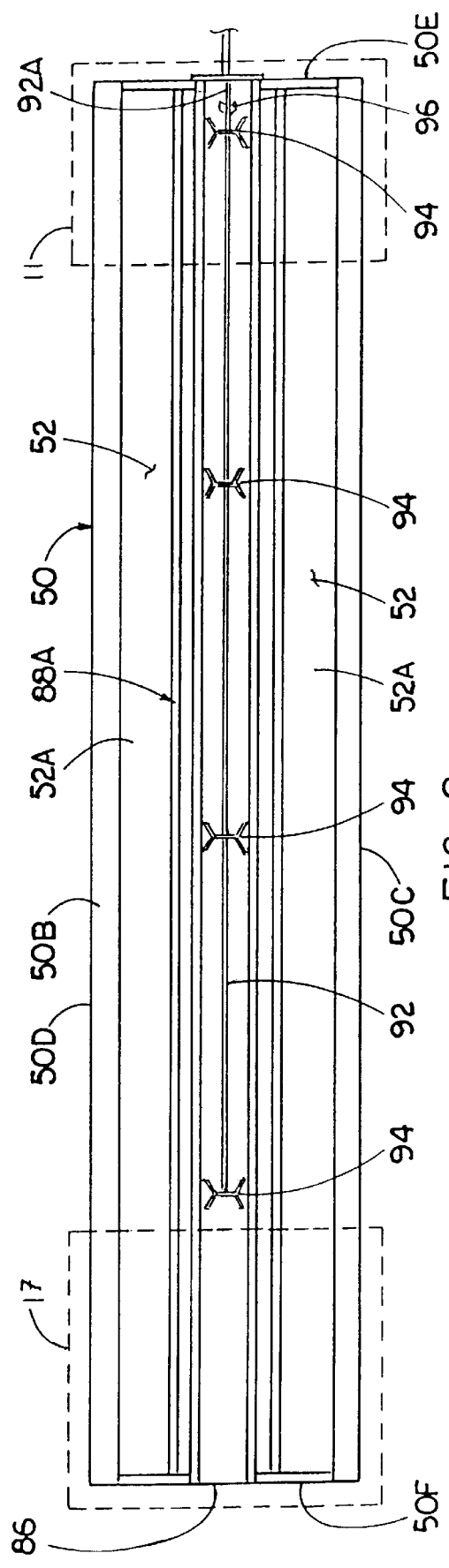
FIG. 9
FIG. 8

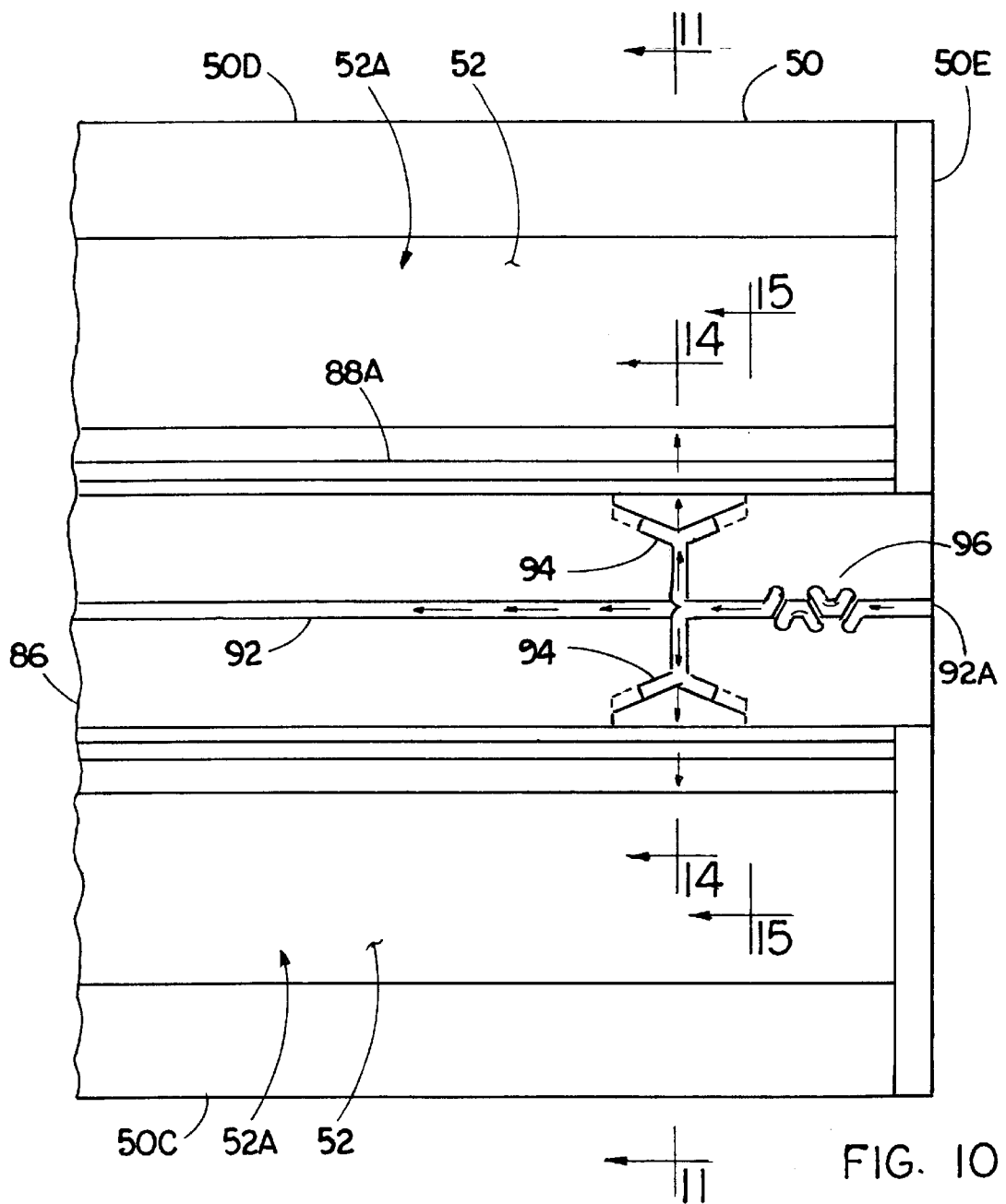
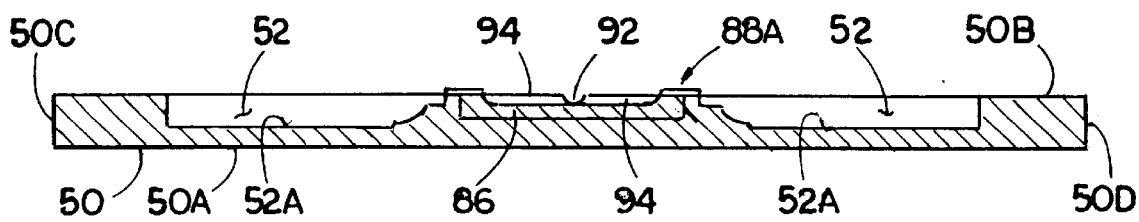

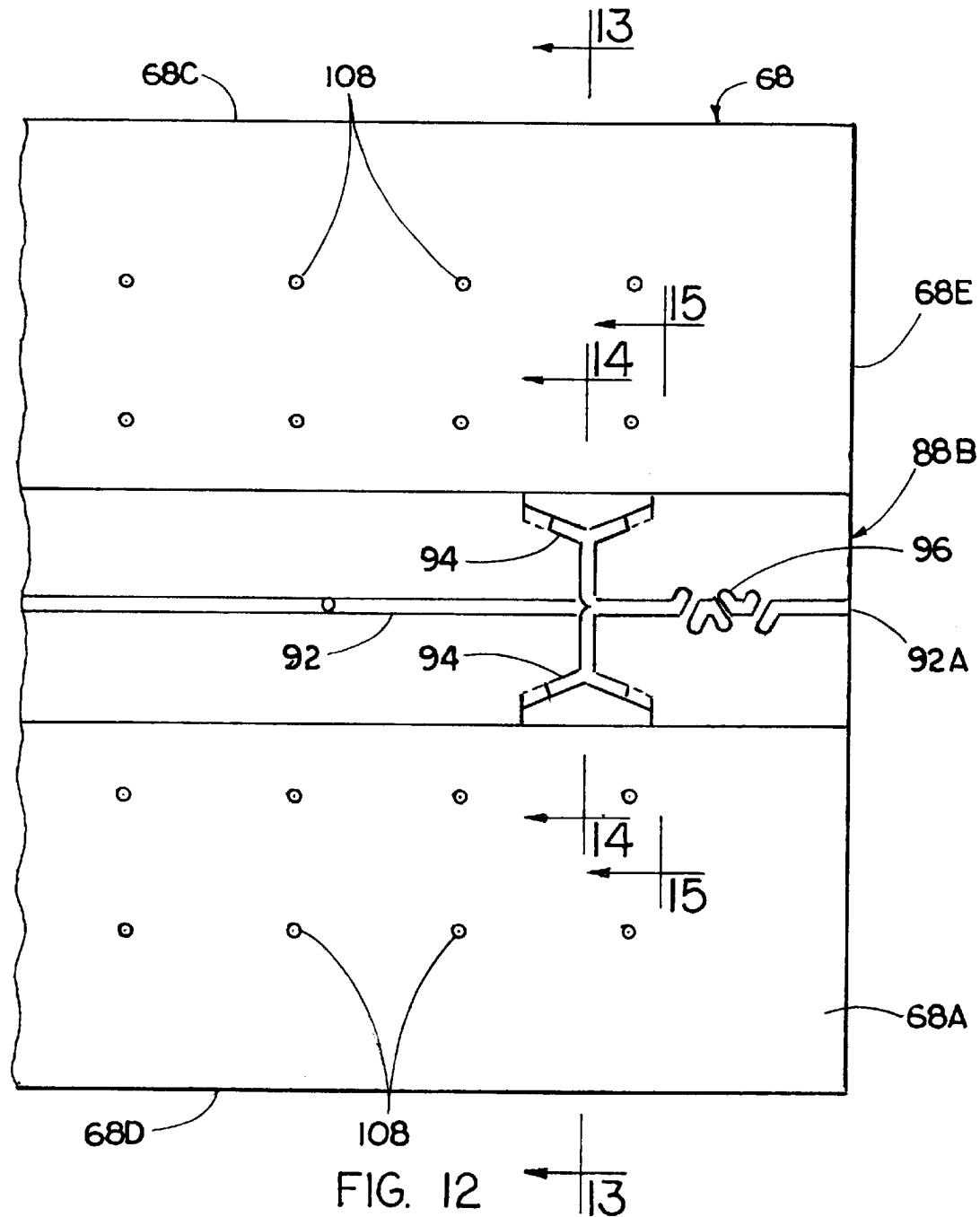
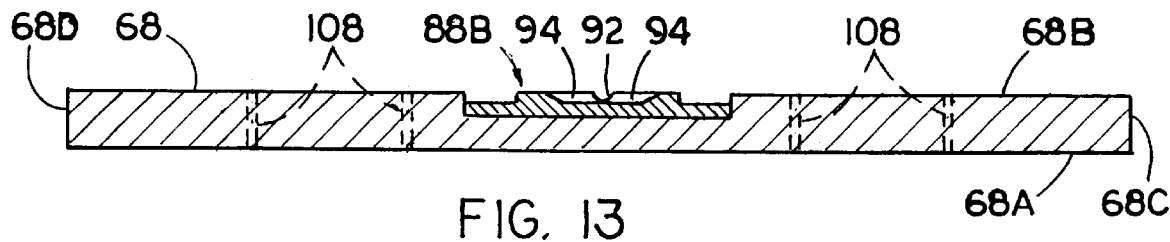

MOLDING APPARATUS HAVING UPPER AND LOWER COMPOSITE MOLD/PRESS UNITS WITH REPLACEABLE MOLD CAVITY FORMING COMPONENTS

BACKGROUND OF THE INVENTION

1. Field of the Invention

The present invention generally relates to manufacture of millwork made of plastic, such as polyurethane, and, more particularly, is concerned with a molding apparatus having upper and lower composite mold/press units with replaceable mold cavity forming components for producing millwork products having different shaped profiles.

2. Description of the Prior Art

Due to the high cost of custom manufacture of wood and the persistent maintenance problems of wood in terms of rotting, cracking, warping, splintering and insect infestation, millwork for entry systems, window treatments, louvers, molding and architectural enhancements made of plastic, such as polyurethane, is increasingly being utilized in both commercial and residential construction, as well as, in historical restoration. Millwork made of plastic, sometimes referred to as formed millwork, is easy to handle, saws cleanly for miter cuts, and can be applied with construction adhesives and/or nails and screws. Such millwork does not need sanding or sealing and can be patched with ordinary (non-solvent) wood fillers. Furthermore, such millwork is substantially maintenance free in that its white acrylic prime finish will not peel and it is UV-stabilized to resist sun fading and readily accepts latex paint. Such millwork has the feel, density, and workability of wood while avoiding the aforementioned problems associated with wood. For convenience in terminology used hereinafter, the term millwork, formed millwork, molded millwork, or plastic millwork refers to millwork made of a plastic material, such as polyurethane, and are used interchangeably throughout this specification.

Heretofore, the process for manufacturing millwork has been simple and straight-forward piece work although very labor intensive and time-consuming. For any given end-product, the present manufacturing process involves, first, making a wood pattern of the desired product and, next, making a silicon rubber mold from the wood pattern which is the negative shape of the product. Then, the rubber mold is placed in a frame-box carrier which supports the mold such that the mold is confined to the shape of the pattern since otherwise the rubber could stretch and flex when it is filled. Following thereafter, the mold is sprayed with a releasing agent which will allow the molded product to be released from the mold and which will also provide a very smooth finish on one side of the product. The releasing agent actually is capable of forming a smooth finish skin on the product. Next, a suitable liquid plastic, such as polyurethane, is poured into the mold and a lid is placed over the open face of the mold. The liquid plastic can expand several times in volume due to an exothermic reaction that will occur in the polyurethane. The closed mold is then placed in a press for about thirty minutes (exothermic reaction time) such that the expandable polyurethane due to its confinement in the closed mold will increase in density as well as volume to provide the desired end-product. After the time has expired, the closed mold is removed from the press, its lid is removed and the product is removed from the mold. The product is now finished off by cleaning its edges, patching any pin holes therein and spray painting its top surface. The life of a normal rubber mold is approximately two hundred pours depending upon the complexity of the specific part, then the construction of a new rubber mold is required from the original pattern. Additionally, any given rubber mold is also limited to a small quantity of parts produced per day because of the heat build up in the rubber mold due to exothermic reaction of the injected material. It can be readily appreciated from the above description that the present manufacturing process is only capable of increasing production accompanied by greater labor utilization at increasing cost.

As the use of certain ones, such as interior and exterior molding, of the millwork pieces continue to increase, there is a need for introduction of innovations in the millwork manufacturing process which will lead toward the goal of achieving increased production of pieces at lower unit costs to be able to satisfy a growing market demand at a reasonable profit.

SUMMARY OF THE INVENTION

The present invention provides a molding apparatus designed to satisfy the aforementioned needs for innovations in the millwork manufacturing process. The present invention is the first to introduce injection molding techniques into the production of millwork products to enable increased production without increasing labor utilization and thus at lower unit cost. The molding apparatus of the present invention provides upper and lower composite mold/press units in which pressing and molding functions are substantially integrated together, unlike in the case of prior art injection molding machines, by an arrangement of operative components that occupy a relatively compact amount of space and effectively press and maintain a mold cavity of the apparatus in a closed condition as a millwork product is produced therein. Further, at least the lower composite unit of the apparatus utilizes easily replaceable mold cavity defining components for producing millwork products having different shaped profiles.

Accordingly, the present invention is directed to an injection molding apparatus for producing millwork pieces. The injection molding apparatus comprises: (a) a workstation supported on a support surface; (b) an elongated lower composite mold/press unit mounted upon the workstation and defining a lower portion of a mold cavity; (c) an elongated upper composite mold/press unit defining an upper portion of the mold cavity; (d) a plurality of support members spaced apart from one another along the lower composite unit, movably mounted to the workstation, and extending above the lower composite unit where the support members mount the upper composite unit generally above and for movement toward and away from the lower composite unit; (e) a plurality of actuators spaced apart from one another along the lower composite unit, mounted to the workstation, and coupled to respective ones of the support members such that actuation of the actuators to a first position causes movement of the support members in a first direction and places the upper composite unit in a mated relationship with the lower composite unit and thereby the upper and lower portions of the mold cavity in a closed condition whereas actuation of the actuators to a second position causes movement of the support members in a second direction and places the upper composite unit in an unmated relationship with the lower composite unit and thereby the upper and lower portions of the mold cavity in an opened condition; and (f) releasable locking means mounted on the workstation adjacent to the lower composite mold/press unit for releasably locking and maintaining the upper and lower composite units in the mated relationship and thereby the upper and lower portions of the mold cavity in the closed condition as a millwork product is produced in the mold cavity. The apparatus further comprises an ejector mechanism mounted on the upper composite unit for separating the product produced in the mold cavity from the upper composite unit when the mold cavity is in the opened condition.

More particularly, the lower composite unit includes a lower mounting plate mounted on the workstation, a lower mold part mounted on the lower mounting plate and defining the lower portion of the mold cavity, a plurality of fasteners removably attaching the lower mold part on the lower mounting plate, and a plurality of coolant flow paths defined through the lower mounting plate and extending between opposite ends thereof. The upper composite unit includes an upper mounting plate mounted to the support members, an upper mold part defining the upper portion of the mold cavity, a pair of opposite spacers disposed and extending between the upper mounting plate and upper mold part so as to space the upper mold part below the upper mounting plate and define a chamber therebetween, a plurality of fasteners removably attaching the upper mold part to the spacers and upper mounting plate, and a coolant flow path defined through the upper mold part and extending between opposite ends thereof.

The lower composite unit further includes a lower liquid molding material distribution segment on the lower mold part and defining a lower portion of a liquid molding material injection arrangement in communication with the lower portion of the mold cavity. The upper composite unit further includes an upper liquid molding material distribution segment on the upper mold part and defining an upper portion of the liquid molding material injection arrangement in communication with the upper portion of the mold cavity such that when the lower and upper mold parts are mated together so as to place the lower and upper portions of the mold cavity in the closed condition the lower and upper portions of the injection arrangement are also mated together so as to provide for laminar and mixed flow distribution of the liquid molding material from outside of the apparatus through the injection arrangement to the mold cavity. Each of the lower and upper portions of the injection arrangement includes a longitudinally extending distribution channel defined in each of the lower and upper segments of the respective lower and upper mold parts and open at one end of the respective lower and upper mold parts, and at least one set of transversely extending transfer grooves defined in each of the lower and upper segments so as to intersect the distribution channel and extend to the mold cavity portion for routing the flow of the liquid molding material from the distribution channel through the set of transfer grooves to the mold cavity portion.

The releasable locking means includes a plurality of locktabs spaced apart from one another longitudinally along and attached on the upper composite unit.

The releasable locking means also includes a plurality of lock cylinders spaced apart from one another longitudinally along and mounted on the workstation adjacent to the lower composite unit and being engageable with and disengageable from the lock tabs to releasably lock and maintain the upper and lower composite units in the mated relationship and thereby the upper and lower portions of the mold cavity in the closed condition.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is an enlarged end elevational view of the apparatus as seen along line 3—3 of FIG. 2.

FIG. 4 is another end elevational view similar to that of FIG. 3 but showing the upper and lower composite units of the apparatus in an unmated relationship.

FIG. 5 is an enlarged vertical sectional view of the apparatus taken along line 5—5 of FIG. 1 showing stop pins, guide pins and a plate of an ejector mechanism on the upper composite unit, a removable and placeable lower mold part of the lower composite unit, lock tabs and cylinders of a releasable locking mechanism and a distribution channel of an injection arrangement defined on respective lower and upper mold parts of the upper and lower composite units.

FIG. 7 is a vertical sectional view similar to that of FIG. 6 except showing the upper and lower composite units in the unmated relationship and with the formed product being seen in phantom lines stuck to the upper mold unit.

FIG. 8 is a top plan view on a reduced scale of the lower mold part of the lower composite unit as seen along line 8—8 of FIG. 6.

FIG. 9 is a bottom plan view on a reduced scale of the upper mold part of the upper composite unit as seen along line 9—9 of FIG. 6.

FIG. 10 is an enlarged detailed view of one end portion of the lower mold part enclosed by the rectangle 11 in FIG. 8.

FIG. 11 is a cross-sectional view of the lower mold part taken along line 11—11 of FIG. 10.

FIG. 12 is an enlarged detailed view of one end portion of the upper mold part enclosed by the rectangle 13 in FIG. 9.

FIG. 13 is a cross-sectional view of the upper mold part taken along line 13—13 of FIG. 12.

DETAILED DESCRIPTION OF THE INVENTION

Figure 1:
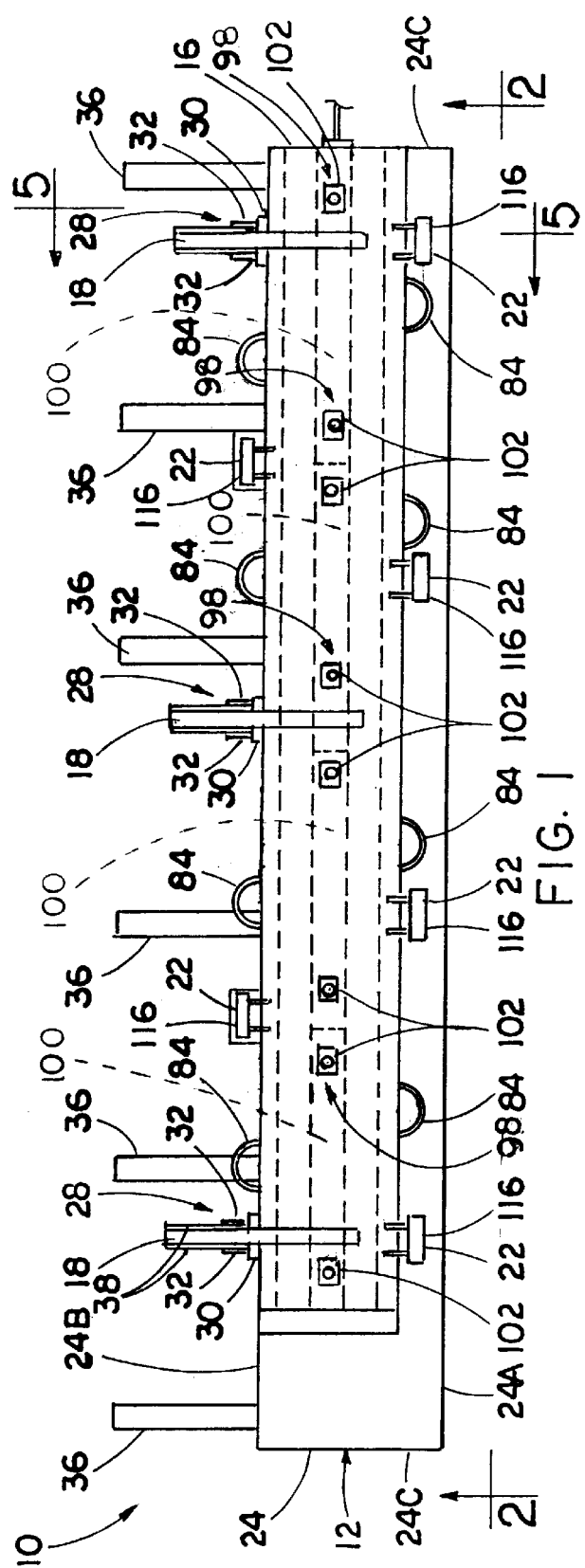
FIG. 1 is a top plan view of a molding apparatus of the present invention for producing formed millwork products made of plastic.
Figure 2:
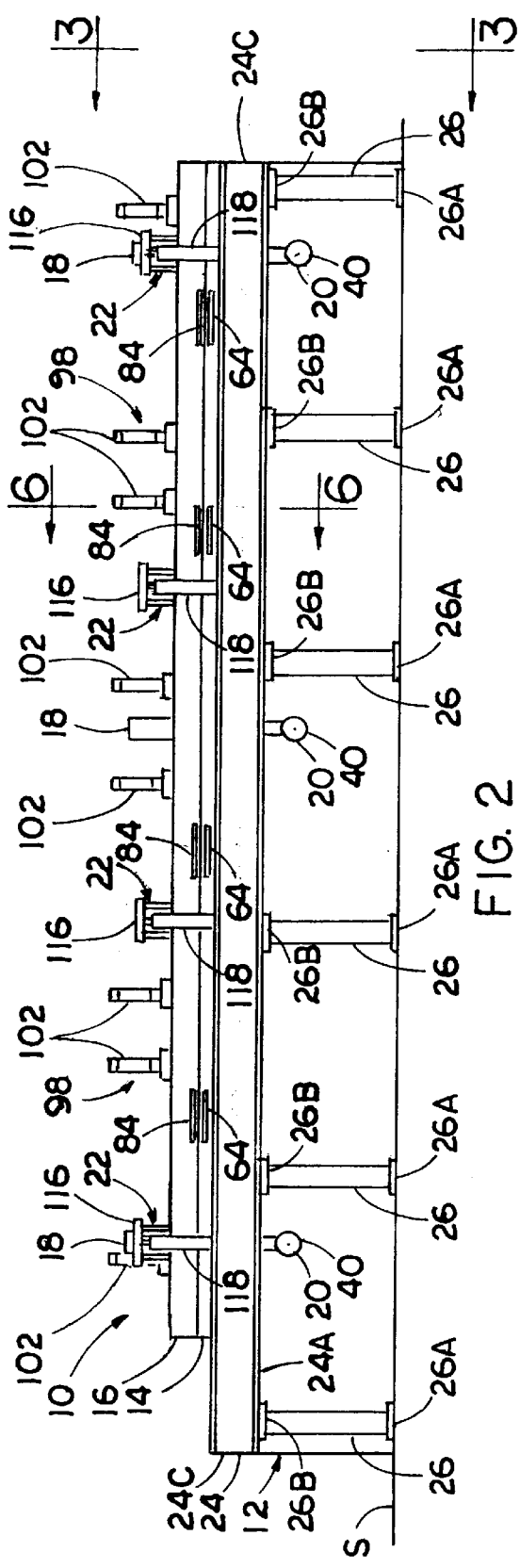
FIG. 2 is a front elevational view of the apparatus as seen along line 2—2 of FIG. 1, showing upper and lower composite mold/press units of the apparatus in a mated relationship.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring to the drawings and particularly to FIGS. 1 to 4, there is illustrated a molding apparatus of the present invention, generally designated 10, for the production of formed or molded millwork products P1, P2, as seen in FIGS. 17 to 20, as well as for other applications. The molding apparatus 10 basically includes a workstation 12, an elongated lower composite mold/press unit 14, an elongated upper composite mold/press unit 16, a plurality of support members 18, a plurality of actuators 20, and releasable locking means 22. The workstation 12 is supported on a support surface S, such as a floor. The lower composite unit 14 is mounted stationarily upon the workstation 12 above the surface S. The support members 18 are spaced apart from one another alongside the lower composite unit 14, pivotally mounted to the workstation 12 and extend above the lower composite unit 14 where they overlie and support the upper composite unit 16 above and for undergoing pivotal movement toward and away from the lower composite unit 14. The actuators 20 are spaced apart from one another below and along the lower composite unit 14, pivotally mounted to the workstation 12, and pivotally coupled to respective ones of the support members 18. Actuation of the actuators 20 to a first position, as seen in FIG. 3, causes pivotal movement of the support members 18 in a first direction, as indicated by arrows F, which pivotally moves the upper composite unit 16 toward and into an adjacent mated relationship with the lower composite unit 14 whereas actuation of the actuators 20 to a second position, as seen in FIG. 4, causes pivotal movement of the support members 18 in a second, or reverse, direction, as indicated by arrows R, which pivotally moves the upper composite unit 16 away from and to a remote unmated relationship with the lower composite unit 14. The releasable locking means 22 is mounted adjacent to the lower composite unit and operable to releasably lock and maintain the lower and upper composite units 14,16 in the mated relationship as a formed or molded millwork product is produced by the apparatus 10.

Referring to FIGS. 1 to 5, the workstation 12 of the apparatus 10 includes an elongated platform 24 and a plurality of legs 26. The platform 24 has opposite front and rear sides 24A, 24B and opposite lateral ends 24C and a generally planar rectangular configuration. The legs 26 are spaced apart from one another in two rows beneath, along and adjacent to the front and rear sides 24A, 24B of the platform 24. The legs 26 at their lower ends 26A stand upright on the support surface S and at their upper ends 26B support the platform 24 thereabove in a generally horizontal orientation.

In the illustrative embodiment, for pivotally mounting the support members 18 along one side, the rear side 24B of the platform 24, the workstation 12 also includes a plurality of bracket structures 28 spaced apart from one another along and fixedly attached to the rear side 24B of the platform 24. By way of example only, in the illustrated embodiment each bracket structure 28 has a generally U-shaped configuration and is formed by a base 30 fixedly attached to the platform 24 and a pair of flanges 32 spaced apart from one another and rigidly attached to the base 30 and extending outwardly therefrom so as to receive and pivotally mount one of the support members 18 therebetween by means of a pair of aligned holes 32A defined in the flanges 32 receiving opposite ends of a pivot pin 34 extending through the one support member 18.

For resisting rearward tipping of the workstation 12 due to the pivotal movement of the support members 18 and upper composite unit 16 therewith relative to the platform 24 and lower composite unit 14 thereon, by way of example only the workstation 12 further can include a plurality of inclined brace structures 36 spaced apart from one another along the rear side 24B of the platform 24. The inclined brace structures 36 are fixedly attached to the legs 26 in the row thereof located beneath the rear side 24B of the platform 24. The inclined brace structures 36 extend rearwardly from the platform 24 and rear row of legs 26 to below and spaced from and between the support members 18 pivotally mounted by the bracket structures 28 along the rear side 24B of the platform 24.

Each support member 18 of the apparatus 10, by way of example only, can be formed by a pair of rigidly interconnected parallel flat plates 38 and disposed in generally vertical and perpendicular orientations relative to the platform 24 and having a generally right angular configuration. Each support member 18 has an intermediate portion 18A received between the spaced apart flanges 32 of a respective one of the bracket structures 28 and receiving therethrough one of the pivot pins 34 to thereby pivotally mount the support member 18 to the rear side 24B of the platform 24 via the one bracket structure 28. Each support member 18 also has an upper portion 18B rigidly attached to and extending from the intermediate portion 18A thereof to above the platform 24 where the upper portion 18B of the support member 18 overlies and fixedly mounts the upper composite unit 16 generally above the lower composite unit 14. As each support member 18 is concurrently pivotally moved about its respective pivot pin 34 between the angularly-displaced positions shown in FIGS. 3 and 4, the upper composite unit 16 mounted to the support members 18 undergoes pivotal movement toward and away from the lower composite unit 14 on the platform 24. Each support member 18 further has a lower portion 18C rigidly attached to and extending from the intermediate portion 18A thereof to below the elevation of the platform 24 and in the generally right angular relationship to the upper portion 18B.

Each of the actuators 20 of the apparatus 10, by way of example only, can be either a hydraulic or pneumatic cylinder 40 with a piston rod 42 reciprocally mounted thereto and retractible into and extensible from the hydraulic or pneumatic cylinder 40. The cylinders 40 are pivotally coupled at their rearward ends 40A by pivot pins 44 to flanges 45 attached to and extending below the platform 24 along and adjacent to the front side 24A thereof. The piston rods 42 are pivotally coupled at their forward ends 42A by pivot pins 46 to the lower portions 18C of the support members 18 where the forward end 42A of each piston rod 42 is received between the lower ends 38A of the pair of flat plates 38 forming the respective ones of the support members 18. Concurrent extension of each of the piston rods 42 from its respective cylinder 40 to the first position causes pivotal movement of the support members 18 in the first direction, being counter-clockwise as viewed in FIG. 3, which places the upper composite unit 16 in the mated relationship with the lower composite unit 14. On the other hand, concurrent retraction of each of the piston rods 42 into its respective cylinder 40 to the second position causes pivotal movement of the support members 18 in the second opposite direction, being clockwise as viewed in FIG. 4, which places the upper composite unit 16 in the unmated relationship with the lower composite unit 14.

It should be understood from the illustrative embodiment just described that the mounting and positioning of the support members 18 and actuators 20 operate in a pivotal clamshell type mode; however, in keeping with the principles of the present invention, the mounting and positioning of the support members 18 and actuators 20 can be so arranged such that the lower and upper mold/press units 14, 16 move toward and away from one another in an upright or vertical mode.

Referring now to FIGS. 5 to 15, the lower composite unit 14 of the apparatus 10 includes a lower mounting plate 48 of a generally flat rectangular configuration and having opposite bottom and top planar surfaces 48A, 48B, opposite front and rear sides 48C, 48D and opposite lateral ends 48E, 48F. The lower mounting plate 48 at its bottom surface 48A rests upon an upper surface 24E of the platform 24. The lower composite unit 14 also includes a lower mold part 50 of generally flat rectangular configuration and having opposite lower and upper surfaces 50A, 50B, opposite front and rear sides 50C, 50D and opposite lateral ends 50E, 50F. The lower mold part 50 at its lower surface 50A overlies and is mounted upon the top surface 48B of the lower mounting plate 48 such that the opposite front and rear sides 50C, 50D and opposite lateral ends 50E, 50F of the lower mold part 50 are positioned directly above the opposite front and rear sides 48C, 48D and opposite lateral ends 48E, 48F of the lower mounting plate 48. The lower mold part 50 at its upper surface 50B defines and has recessed therein a product profile-defining lower portion 52A of a mold cavity 52 between the opposite front and rear sides 50C, 50D and opposite lateral ends 50E, 50F of the lower mold part 50. The lower composite unit 14 further includes a plurality of fasteners 54 for removably and replaceably attaching the lower mold part 50 upon the lower mounting plate 48. The fasteners 54 extend upwardly through passages 56 defined through, and adjacent to the front and rear sides 48C, 48D of, the lower mounting plate 48 and open at the bottom and top surfaces 48A, 48B thereof. The fasteners 54 have tool-engaging head ends 54A for use in turning the fasteners 54 to screw threaded ends 54B into and from internally threaded holes 58 tapped into the lower mold part 50 from the lower surface 50A thereof. The lower composite unit 14 still further includes a coolant flow path 60 defined through the lower mounting plate 48. The coolant flow path 60 includes elongated parallel passages 62 defined through the lower mounting plate 48 between its opposite front and rear sides 48C, 48D and C-shaped tubes 64 disposed at the exterior of the lower mounting plate 48 adjacent to the front and rear sides 48C, 48D thereof and interconnecting adjacent ends of the passages 62 so as to define the coolant flow path 60 in a serpentine continuous manner through the lower mounting plate spaced from the bottom and top surfaces 48A, 48B thereof and between the opposite front and rear sides 48C, 48D thereof.

The upper composite unit 16 of the apparatus 10 includes an upper mounting plate 66 of a generally flat rectangular configuration and having opposite bottom and top planar surfaces 66A, 66B, opposite front and rear sides 66C, 66D and opposite lateral ends 66E, 66F. The upper mounting plate 66 at its top surface 66B is attached to the upper portions 18B of the support members 18. The upper composite unit 16 also includes an upper mold part 68 of generally flat rectangular configuration and having opposite lower and upper surfaces 68A, 68B, opposite front and rear sides 68C, 68D and opposite lateral ends 68E, 68F. The upper mold part 68 underlies the upper mounting plate 66 such that the opposite front and rear sides 68C, 68D and opposite lateral ends 68E, 68F of the upper mold part 68 are positioned directly below the opposite front and rear sides 66C, 66D and opposite lateral ends 66E, 66F of the upper mounting plate 66. The upper mold part 68 at its lower surface 68A defines a product profile-defining upper portion 52B of the mold cavity 52 between the opposite front and rear sides 68C, 68D and opposite lateral ends 68E, 68F of the upper mold part 68. In the illustrated example, the lower surface 68A is generally flat or planar in configuration in view that the desired profile being provided on the rear side of the molded product produced by the apparatus 10 is flat. However, it will be readily understood that a three-dimensional profile could be provided by recessing the negative of such profile into the lower surface 68A of the upper mold part 68. The upper composite unit 16 also includes a pair of opposite spacers 70 disposed and extending between the upper mounting plate 66 and upper mold part 68 along and adjacent to the respective opposite front and rear sides 66A, 66B and 68A, 68B thereof so as to space the upper mold part 68 below the upper mounting plate 66 and thereby define a chamber 72 therebetween. The upper composite unit 16 further includes a plurality of fasteners 74 for removably and replaceably attaching the upper mold part 68 to the spacers 70 and upper mounting plate 66. The fasteners 74 extend downwardly through passages 76 defined through and adjacent to the front and rear sides 66C, 66D of the upper mounting plate 66 and open at the bottom and top surfaces 66A, 66B thereof and therefrom downwardly through passages 78 defined through the spacers 70 and aligned with the passages 76 through the upper mounting plate 66. The fasteners 74 have wrench-engaging head ends 74A for turning the fasteners 74 to screw threaded ends 74B thereof into and from internally threaded holes 78 tapped into the upper mold part 66 from the upper surface 66A thereof. The upper composite unit 16 still further includes a coolant flow path 80 defined through the upper mold part 68. The coolant flow path 80 includes elongated parallel passages 82 defined through the upper mold part 68 between its opposite front and rear sides 68C, 68D and C-shaped tubes 84 disposed at the exterior of the upper mold part 68 adjacent to the front and rear sides 68C, 68D thereof and interconnecting adjacent ends of the passages 82 so as to define the coolant flow path 80 in a serpentine continuous manner through the upper mold part spaced from the bottom and top surfaces 68A, 68B thereof and between the opposite front and rear sides 68C, 68D thereof. Alternatively, if desired, the upper mold part 68 could be separated into two portions along dashed line D in FIG. 6. The upper portion having the coolant path 80 therein could be fixed to the spacers 70 while only the lower portion is removable and replaceable.

Figure 6:
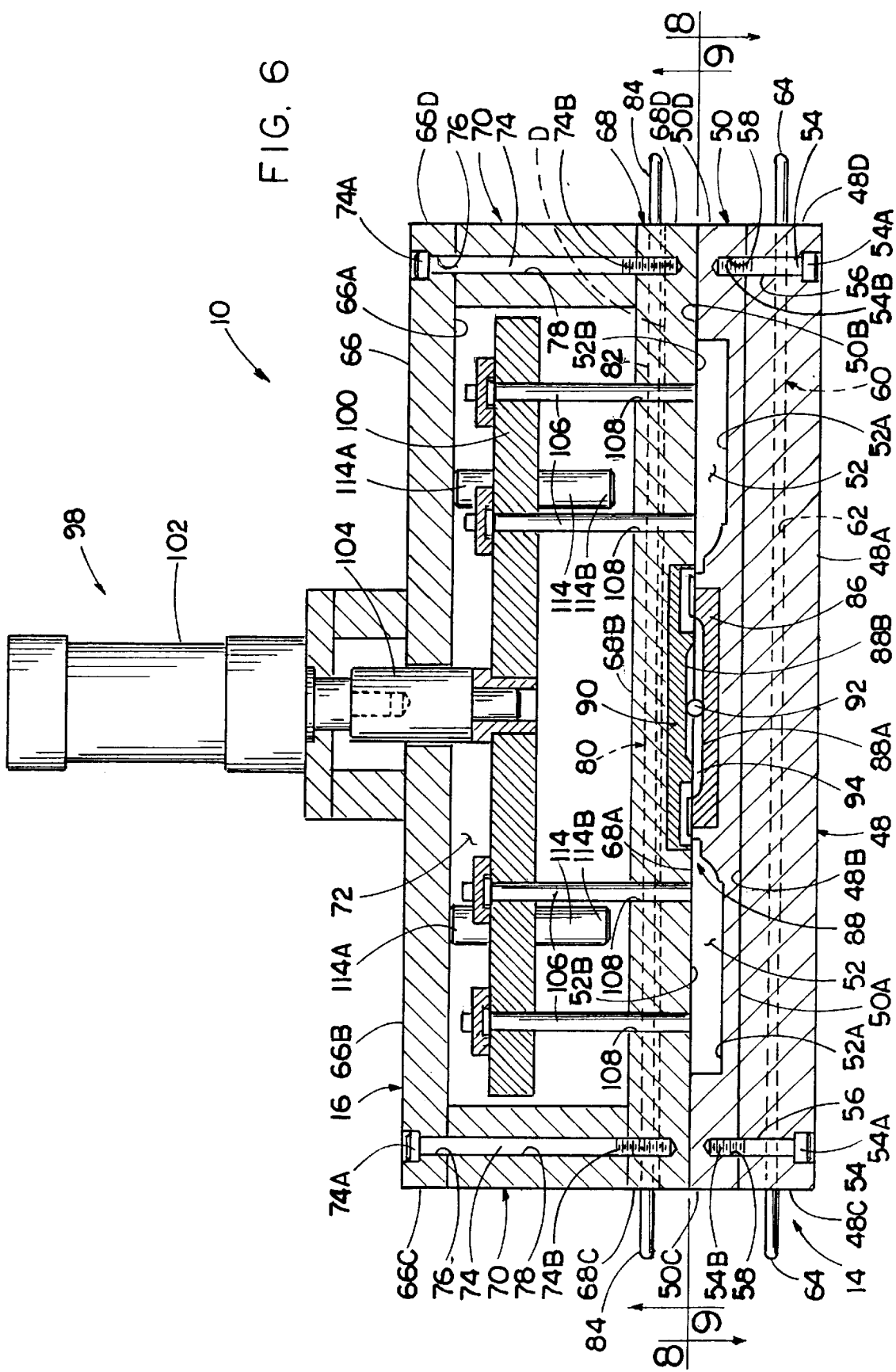
FIG. 6 is an enlarged detailed view, as seen along line 6—6 of FIG. 3, of the upper and lower composite units of the apparatus shown in FIG. 5 now showing ejector pins and the plate of the ejector mechanism on the upper composite unit and upper and lower coolant flow lines on the respective lower and upper mold parts of the upper and lower composite units.
Figure 14:
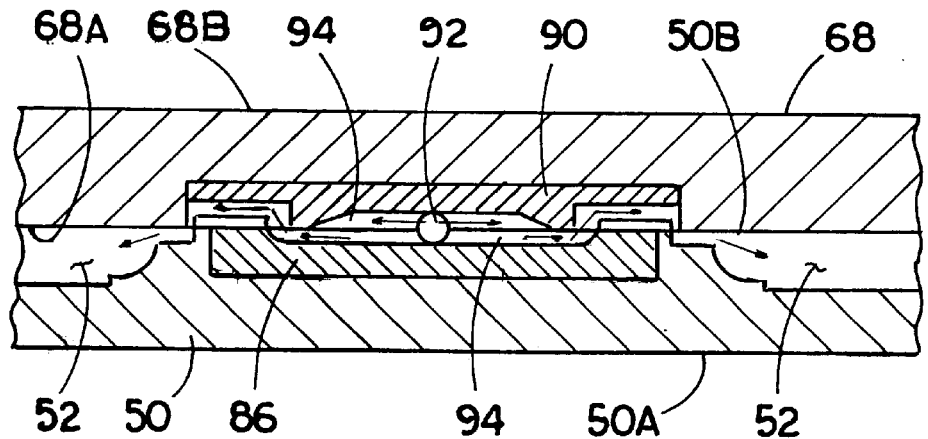
FIG. 14 is a fragmentary cross-sectional view of the lower and upper mold parts taken along lines 14—14 of FIGS. 10 and 12 through one of the sets of transfer grooves defined in lower and upper segments on the upper and lower mold parts with the upper and lower composite units in the mated relationship.
Figure 15:
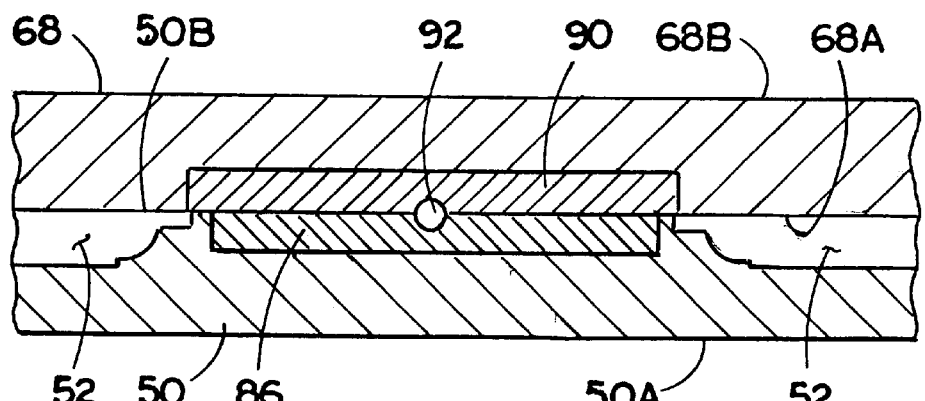
FIG. 15 is another fragmentary cross-sectional view of the lower and upper mold parts now taken along lines 15—15 of FIGS. 10 and 12 through the distribution channel defined in the lower and upper segments on the upper and lower mold parts with the upper and lower composite units in the mated relationship.

The lower composite unit 14 also includes a lower liquid molding material distribution segment 86 on the lower mold part 50 and defining a lower portion 88A of an liquid molding material injection arrangement 88 in communication with the lower portion 52A of the mold cavity 52. The upper composite unit 16 also includes an upper liquid molding material distribution segment 90 on the upper mold part 68 and defining an upper portion 88B of the liquid molding material injection arrangement 88 in communication with the upper portion 52B of the mold cavity 52. When lower and upper mold parts 50, 68 are mated together so as to place the lower and upper portions 52A, 52B of the mold cavity 52 in the closed condition, as seen in FIGS. 3, 5 and 6, the lower and upper portions 88A, 88B of said injection arrangement 88 are also mated together so as to provide for flow distribution of the liquid molding material from outside of the molding apparatus 10 to the mold cavity 52. More particularly, each of the lower and upper portions 88A, 88B of the injection arrangement 88 includes a longitudinally extending distribution channel 92 and at least one and preferably a plurality of sets of transversely extending transfer grooves 94. The distribution channel 92 and sets of transfer grooves 94 are defined in each of the lower and upper segments 86, 90 of the respective lower and upper mold parts 50, 68. The distribution channel 92 is open at one end 50E, 66E of each of the respective lower and upper mold parts 50, 68. The sets of transfer grooves 94 intersect the distribution channel 92 and extend to the respective one of the mold cavity portions 52A, 52B for routing the flow of the liquid molding material from the distribution channel 92 through the sets of transfer grooves 94 to the mold cavity portion 52A, 52B. Each of the upper and lower portions 88A, 88B of the injection arrangement 88 further includes mixer vane means 96 defined in each of the lower and upper segments 86, 90 so as to intersect the distribution channel 92 between the one open end 92A thereof and a first of the sets of transfer grooves 94 spaced from the one open end 92A, as seen in FIGS. 8 to 13.

It should be further understood from the above description that either the lower mold part 50 of the lower composite unit 14 with its product profile-defining portion 52A or the upper mold part 68 of the upper composite unit 16 with its product profile-defining portion 52B or both the lower mold part 50 and upper mold part 68 can be easily removed and replaced with another corresponding lower or upper mold part 50', 68'(not shown) to form a new mold cavity 52'(not shown) having a different configuration and profile than the mold cavity 52 so as tp produce a different shaped molded product.

In the illustrated embodiment and by way of example only, the lower and upper segments 86, 90 of the respective lower and upper mold parts 50, 68 extending centrally and longitudinally between the opposite lateral ends 50E, 50F and 68E, 68F thereof such that two mold cavities 52 are defined by the lower and upper mold parts 50, 68 along opposite longitudinal sides of the lower and upper segments 86, 90 between the lower and upper segments 86, 90 and the front and rear sides 50C, 50D and 68C, 68D of the lower and upper mold parts 50, 68. Furthermore, the open end 92A of the distribution channel 92 can be connected in any suitable manner to a source of pressurized supply, such as a pump and reservoir, of the liquid molding material.

Referring to FIGS. 1 to 7, the apparatus 10 further includes an ejector mechanism 98 associated with the upper composite unit 16 for separating the product produced in the mold cavity 52 from the upper mold part 68 of the upper composite unit 16 when the mold cavity 52 is in the opened condition relative to the lower composite unit 14. The ejector mechanism 98 includes at least one and preferably a plurality of support plates 100 of generally planar configurations disposed in the chamber 72 of the upper composite unit 16 between the upper mounting plate 66 and upper mold part 68 thereof and means in the form of ejector cylinders 102 mounted on the upper mounting plate 66 and having piston rods 104 extending therethrough and attached to respective ones of the support plates 100 for supporting and reciprocally moving the support plates 100 toward and away from the upper mounting plate 66 and upper mold part 68 of the upper composite unit 16. The ejector mechanism 98 also includes a plurality of ejector pins 106 spaced apart from one another, mounted to the support plates 100 and extending therefrom through holes 108 defined through the upper mold part 68 for engaging and causing separation of the product produced in the mold cavity 52 from the upper mold part 68 when the support plates 100 are moved toward the upper mold part 68 when the mold cavity 52 is in the opened condition, as depicted in FIG. 7. As illustrated in FIG. 1, apparatus 10 has been shown with four separate support plates 100 and with two cylinders 102 being associated with each support plate 100. More particularly, the support plates 100 are arranged end-to-end and movable independent of one another such that the support plates 100 and ejector pins 106 mounted thereto can be sequentially moved toward the upper mold part 68 to progressively separate the product from the upper composite unit 16 along the length of the upper composite unit 16 starting at one end thereof. The ejector mechanism 98 further includes a plurality of guide pins 110 extending through the chamber 72 and apertures 112 in the support plates 100 and between the upper mounting plate 66 and the upper mold part 68. The guide pins 110 at their opposite ends are mounted to the upper mounting plate 66 and upper mold part 68 for guiding reciprocal movement of the support plates 100 between the upper mounting plate 66 and upper mold part 68. The ejector mechanism 98 still further includes a plurality of stop pins 114 mounted to and extending in opposite directions from the support plates 100 and being movable therewith and having opposite ends 114A, 114B which will contact the upper mounting plate 66 and upper mold part 68 so as to limit the reciprocal movement of the support plates 100 toward and away from the upper mounting plate 66 and upper mold part 68.

Referring to FIGS. 1 to 5, the releasable locking means 22 of the apparatus 10 includes a plurality of lock tabs 116 spaced apart from one another along and attached on the exterior of the upper mounting plate 66 of the upper composite unit 16 at opposite front and rear sides 66C, 66D thereof and a plurality of lock cylinders 118 spaced apart from one another along and mounted on the platform 24 adjacent to the front and rear sides 24A, 24B thereof and adjacent to the lower composite unit 14 and the lock tabs 116 on the upper composite unit 16. The lock cylinders 118 have retractible and extensible piston rods 120 being engageable with and disengageable from the lock tabs 116 to releasably lock and maintain the lower and upper composite units 14,16 in the mated relationship and thereby the lower and upper portions 52A, 52B of the mold cavity 52 in closed condition.

Figure 16:
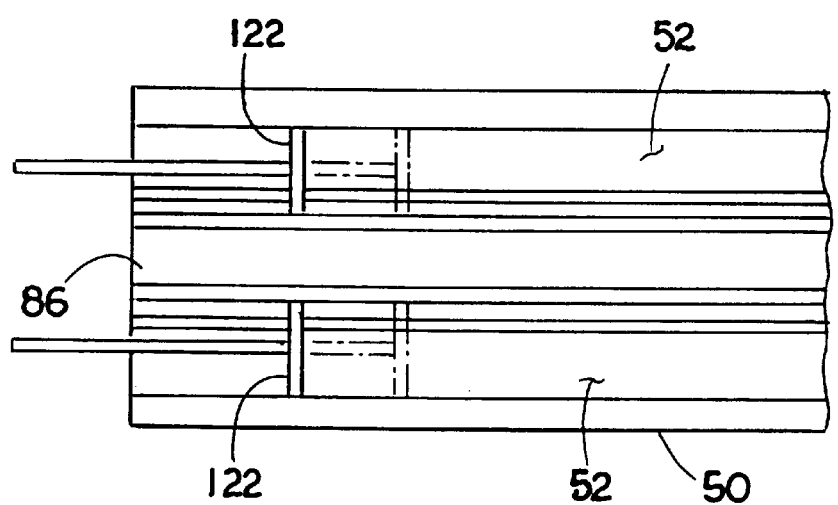
FIG. 16 is an enlarged detailed view of the opposite end portion of the lower mold part enclosed by the rectangle 17 in FIG. 8 showing movable plugs disposed in profile cavities of the lower mold part whose positions can be adjusted to change the lengths of the products produced by the apparatus.
Figure 18:
FIG. 18 is an end elevational view of the one product as seen along line 18—18 of FIG. 17 showing one profile shape on the product as produced by a correspondingly-shaped profile cavity provided in one lower mold part employed in the apparatus.
Figure 20:
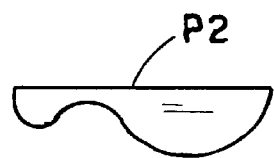
FIG. 20 is an end elevational view of the other product as seen along line 20—20 of FIG. 19 showing another profile shape on the product as produced by a correspondingly-shaped profile cavity provided in the other lower mold part employed in the apparatus.
Figure 17:
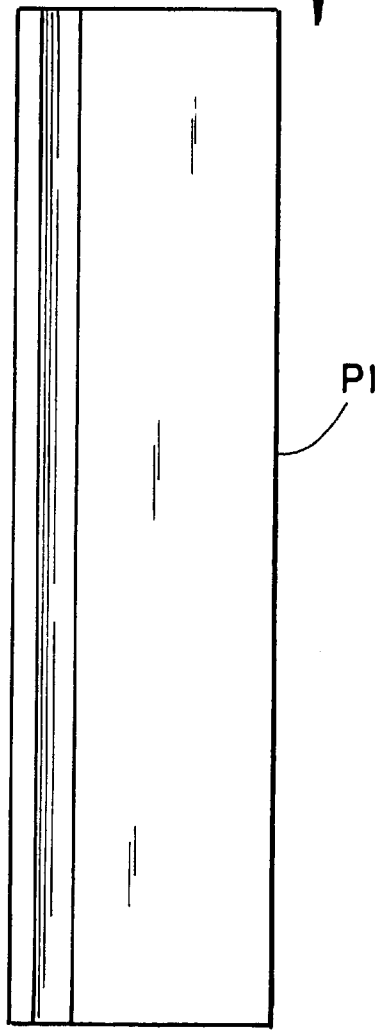
FIG. 17 is a plan view of one formed millwork product which can be produced by the apparatus of FIG. 1.
Figure 19:
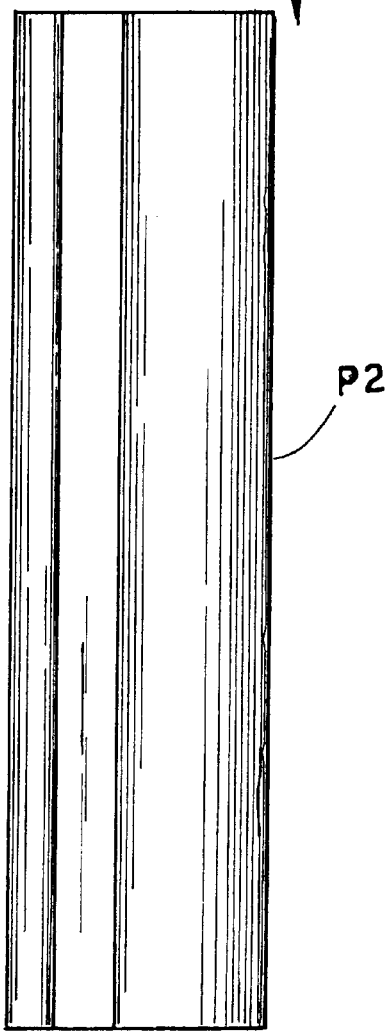
FIG. 19 is a plan view of another formed millwork product which can be produced by the apparatus of FIG. 1 after removable and replacement of the one lower mold part with another lower mold part.

Referring to FIG. 16, the apparatus 10 has a plurality of plugs 122 disposed in the mold cavity defining portions 52A, 52B that close the respective ends 50F, 68F of the lower and upper mold parts 50, 68 opposite from the one ends 50E, 68E thereof. These plugs 122 can be provided so that they are adjustably movable along the mold cavity defining portions 52A, 52B for changing in length the product produced by the apparatus 10 in the mold cavity 52.

In operation, the mold cavity defining portion 52A of the lower mold part 50 of the lower composite unit 14 is first sprayed with a releasing agent (which becomes a smooth finish coat on the exterior face of the product). The actuators 20 are then actuated and extended so as to bring the lower and upper composite units 14, 16 in mated relationship together. Next, the releasably locking mechanisms 22 are activated to releasably lock and maintain the lower and upper composite units 14, 16 in their mated relationship. The liquid molding material, such as liquid polyurethane, is then injected into the mated lower and upper composite units 14, 16 via the longitudinal distribution channel 92 and set(s) of transfer grooves 94 through the end 92A of the channel 92. An exothermic reaction in the liquid molding material occurs and after completion the locking mechanisms 22 are activated to release and allow pivoting of the upper composite unit 16 away from the lower composite unit 14. The ejector mechanism 98 is then activated such that its ejection fingers 106 engage and eject the molded product away from the upper mold part 68 of the upper composite unit 16.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A molding apparatus for producing formed millwork products, said apparatus comprising:
    (a) a workstation supported on a support surface;
    (b) an elongated lower composite mold/press unit mounted on said workstation above the support surface and defining a lower portion of a mold cavity;
    (c) an elongated upper composite mold/press unit defining an upper portion of said mold cavity;
    (d) a plurality of support members spaced apart from one another along said lower composite unit, movably mounted to said workstation, and extending above said lower composite unit where said support members mount said upper composite unit generally above and for movement toward and away from said lower composite unit;
    (e) a plurality of actuators spaced apart from one another along said lower composite unit, mounted to said workstation, and coupled to respective ones of said support members such that actuation of said actuators to a first position causes movement of said support members in a first direction and places said upper composite unit in a mated relationship with said lower composite unit and thereby said upper and lower portions of said mold cavity in a closed condition whereas actuation of said actuators to a second position causes movement of said support members in a second direction and places said upper composite unit in an unmated relationship with said lower composite unit and thereby said upper and lower portions of said mold cavity in an opened condition; and
    (f) releasable locking means mounted adjacent to said lower composite unit for releasably locking and maintaining said upper and lower composite units in said mated relationship and thereby said upper and lower portions of said mold cavity in said closed condition as a formed millwork product is produced in said mold cavity, said lower composite unit including
        a lower mold part defining said lower portion of said mold cavity, and
        a lower liquid molding material distribution segment on said lower mold part and defining a lower portion of a liquid molding material injection arrangement in communication with said lower portion of said mold cavity; and said upper composite unit including
        an upper mold part defining said upper portion of said mold cavity, and
        an upper liquid molding material distribution segment on said upper mold part and defining an upper portion of said liquid molding material injection arrangement in communication with said upper portion of said mold cavity such that when said lower and upper mold parts are mated together so as to place said lower and upper portions of said mold cavity in said closed condition said lower and upper portions of said injection arrangement are also mated together so as to provide for flow distribution of the liquid molding material from outside of said apparatus through said injection arrangement to said mold cavity.

2. The apparatus as recited in claim 1, wherein said workstation further includes:
    an elongated platform; and
    a plurality of legs spaced apart from one another along said platform and standing upright on the support surface below said platform and supporting said platform above said legs.

3. The apparatus as recited in claim 1, wherein each of said support members has an intermediate portion movably mounted to said workstation, an upper portion extending from said intermediate portion to above said lower composite unit where said support members overlie and mount said upper composite unit generally above and for movement toward and away from said lower composite unit, and a lower portion extending from said intermediate portion to below said lower composite unit and in an angular relationship to said upper portion.

4. The apparatus as recited in claim 3, wherein said actuators are extensible and retractible and mounted to said workstation below said lower composite unit and respectively coupled to said lower portions of said support members such that said actuators are extensible to said first position to cause movement of said support members in said first direction and retractible to said second position to cause movement of said support members in said second direction being opposite to said first direction.

5. The apparatus as recited in claim 1, wherein said lower composite unit includes:
    a lower mounting plate mounted on said workstation;
    a lower mold part mounted on said lower mounting plate and defining said lower portion of said mold cavity; and
    a plurality of fasteners removably attaching said lower mold part on said lower mounting plate.

6. The apparatus as recited in claim 5, further comprising:
    a coolant flow path defined through said lower mounting plate and extending between opposite ends thereof.

7. The apparatus as recited in claim 1, wherein said upper composite unit includes:
    an upper mounting plate mounted to said support members;

an upper mold part defining said upper portion of said mold cavity;

a pair of opposite spacers disposed and extending between said upper mounting plate and upper mold part so as to space said upper mold part below said upper mounting plate and define a chamber therebetween; and a plurality of fasteners removably attaching said upper mold part to said spacers and upper mounting plate.

8. The apparatus as recited in claim 7, further comprising:

a coolant flow path defined through said upper mold part and extending between opposite ends thereof.

9. The apparatus as recited in claim 7, further comprising:

an ejector mechanism mounted on said upper composite unit for separating the product produced in said mold cavity from said upper composite unit when said mold cavity is in said opened condition.

10. The apparatus as recited in claim 9, wherein said ejector mechanism includes:

at least one support plate disposed in said camber of said upper composite unit between said upper mounting plate an upper mold part thereof;

means for reciprocally moving said support plate within said chamber toward and away from said upper mounting plate and upper mold part of said upper composite unit; and a plurality of ejector pins spaced apart from one another, mounted to said support plate, and extending therefrom through holes defined in said upper mold part for engaging and causing separation of the product produced in said mold cavity from said upper composite unit when said support plate is moved toward said upper mold part when said mold cavity is in said opened condition.

11. The apparatus as recited in claim 10, wherein said ejector mechanism includes a plurality of support plates arranged end-to-end and movable independently of one another such that said support plates and respective ejector pins mounted thereto are sequentially moved toward said upper mold part to progressively separate the product from said upper composite unit lengthwise along said upper composite unit starting at one end thereof.

12. The apparatus as recited in claim 10, wherein said ejector mechanism further includes:

a plurality of guide pins extending through said chamber and through apertures in said support plate and between and mounted to said upper mounting plate and upper mold part for guiding reciprocal movement of said support plate within said chamber between said upper mounting plate and upper mold part; and a plurality of stop pins mounted to and extending in opposite directions from said support plate and being movable therewith and having opposite ends which will contact said upper mounting plate and upper mold part so as to limit said reciprocal movement of said support plate within said chamber toward and away from said upper mounting plate and upper mold part.

13. The apparatus as recited in claim 1, further comprising:

an ejector mechanism mounted on said upper composite unit for separating the product produced in said mold cavity from said upper composite unit when said mold cavity is in said opened condition.

14. The apparatus as recited in claim 1, wherein each of said lower and upper portions of said injection arrangement includes:

a longitudinally extending distribution channel defined in each of said lower and upper segments of said respective lower and upper mold parts and open at said one ends of said respective lower and upper mold parts; and at least one set of transversely extending transfer grooves defined in each of said lower and upper segments so as to intersect said distribution channel and extend to said mold cavity portion for routing the flow of the liquid molding material from said distribution channel through said set of transfer grooves to said mold cavity portion.

15. The apparatus as recited in claim 1, wherein at least one of said lower mold part of said lower composite unit and said upper mold part of said upper composite unit is removably mounted such that said lower mold part or said upper mold part can be easily replaced with another lower mold part or upper mold part so as to form a new mold cavity to produce a new formed millwork product having a different configuration and profile.

16. The apparatus as recited in claim 1, wherein said releasable locking means includes:

a plurality of lock tabs spaced apart from one another along and attached on said upper composite unit; and a plurality of lock cylinders spaced apart from one another along and mounted on said workstation adjacent to said lower composite unit and being engageable with and disengageable from said lock tabs to releasably lock and maintain said upper and lower composite units in said mated relationship and thereby said upper and lower portions of the mold cavity in said closed condition.

17. An injection molding apparatus for producing formed millwork pieces, said apparatus comprising:

(a) a workstation having a platform supported in a generally horizontal orientation above a support surface;

(b) an elongated lower composite mold/press unit mounted stationary upon said platform of said workstation and including (i) a lower mold part defining a lower portion of a mold cavity, and (ii) a lower liquid molding material distribution segment on said lower mold part defining a lower portion of a liquid molding material injection arrangement being open at one end of said lower mold part and provided in communication with said lower portion of said mold cavity;

(c) an elongated upper composite mold/press unit including (i) an upper mold part defining said upper portion of said mold cavity, and (ii) an upper liquid molding material distribution segment on said upper mold part defining an upper portion of said liquid molding material injection arrangement being open at one end of said upper mold part and being provided in communication with said upper portion of said mold cavity such that when said lower and upper mold parts are mated together so as to place said lower and upper portions of said mold cavity in said closed condition said lower and upper portions of said liquid molding material injection arrangement are also mated together so as to provide for flow distribution of the liquid molding material from outside of said apparatus through said injection arrangement to said mold cavity;

(d) a plurality of support members spaced apart from one another along said platform, movably mounted to said workstation, and extending above said platform where said support members mount said upper composite unit generally above and for movement toward and away from said lower composite unit;

(e) a plurality of actuators spaced apart from one another along said platform, mounted to said workstation below said platform, and coupled to respective ones of said support members such that actuation of said actuators to a first position causes movement of said support members in a first direction and places said upper composite unit in a mated relationship with said lower composite unit and thereby said upper and lower portions of said mold cavity in a closed condition whereas actuation of said actuators to a second position causes movement of said support members in a second direction and places said upper composite unit in an unmated relationship with said lower composite unit and thereby said upper and lower portions of said mold cavity in an opened condition; and (f) a plurality of releasable locking mechanisms spaced apart from one another along and mounted adjacent to said lower composite unit and being operable for releasably locking and maintaining said upper and lower composite units in said mated relationship and thereby said upper and lower portions of said mold cavity in said closed condition as a formed millwork product is produced in said mold cavity.

18. The apparatus as recited in claim 17, wherein each of said support members has an intermediate portion movably mounted to said platform, an upper portion extending from said intermediate portion to above said platform where said support members overlie and mount said upper composite unit generally above and for movement toward and away from said lower composite unit, and a lower portion extending from said intermediate portion to below said platform and in an angular relationship to said upper portion.

19. The apparatus as recited in claim 18, wherein said actuators are extensible and retractible and mounted to said workstation below said platform and respectively coupled to said lower portions of said support members such that extension of said actuators to said first position causes movement of said support members in said first direction and retraction of said actuators to said second position causes movement of said support members in said second direction being opposite to said first direction.

20. The apparatus as recited in claim 17, wherein each of said lower and upper portions of said injection arrangement includes:

a longitudinally extending distribution channel defined in each of said lower and upper segments of said respective lower and upper mold parts and open at said one ends of said respective lower and upper mold parts; and a plurality of sets of transversely extending transfer grooves defined in each of said lower and upper segments at spaced apart locations along said distribution channel so as to intersect said distribution channel and extend to said mold cavity portion for routing the flow of the liquid molding material from said distribution channel through said sets of transfer grooves to said mold cavity portion.

21. The apparatus as recited in claim 20, wherein each of said lower and upper portions of said injection arrangement further includes mixer vane means defined in each of said lower and upper segments so as to intersect said distribution channel between said one open end thereof and a first of said sets of said transfer grooves spaced from said one open end.

22. The apparatus as recited in claim 17, further comprising:

a plug adjustably disposed in said mold cavity defining portion at an end of each of said lower and upper mold parts opposite from said one end thereof for changing in length the product produced by the apparatus in said mold cavity.

23. The apparatus as recited in claim 17, wherein each of said releasable locking mechanisms includes:

a pair of lock tabs spaced apart from one another at opposite sides of and attached on said upper composite unit; and a plurality of lock cylinders spaced apart from one another along and mounted on said platform adjacent to said lower composite unit and being engageable with and disengageable from said lock tabs to releasably lock and maintain said upper and lower composite units in said mated relationship and thereby said upper and lower portions of the mold cavity in said closed condition.

24. The apparatus as recited in claim 17, further comprising:

an ejector mechanism mounted on said upper composite unit for separating the product produced in said mold cavity from said upper mold part of said upper composite unit when said mold cavity is in said opened condition.

25. The apparatus as recited in claim 17, wherein at least one of said lower mold part of said lower composite unit and said upper mold part of said upper composite unit is removably mounted such that said lower mold part or said upper mold part can be easily replaced with another lower mold part or upper mold part so as to form a new mold cavity to produce a new formed millwork product having a different configuration and profile.

* * * * *